United States Patent
Zhang et al.

(10) Patent No.: US 11,078,981 B2
(45) Date of Patent: Aug. 3, 2021

(54) HYDRAULIC MEM-INERTER CONTAINER DEVICE AND APPLICATIONS THEREOF

(71) Applicant: JIANGSU UNIVERSITY, Jiangsu (CN)

(72) Inventors: Xiaoliang Zhang, Jiangsu (CN); Jiamei Nie, Jiangsu (CN); Zhenxing Huang, Jiangsu (CN); Hai He, Jiangsu (CN); Long Chen, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 233 days.

(21) Appl. No.: 16/158,857

(22) Filed: Oct. 12, 2018

(65) Prior Publication Data

US 2019/0107168 A1    Apr. 11, 2019

Related U.S. Application Data

(63) Continuation of application No. PCT/CN2016/089855, filed on Jul. 13, 2016.

(30) Foreign Application Priority Data

May 9, 2016    (CN) .......................... 201610300595.1

(51) Int. Cl.
*F16F 9/34*      (2006.01)
*F16F 9/20*      (2006.01)
(Continued)

(52) U.S. Cl.
CPC .......... *F16F 9/3405* (2013.01); *F16F 7/1034* (2013.01); *F16F 9/20* (2013.01); *F16F 9/3235* (2013.01); *F16F 9/346* (2013.01)

(58) Field of Classification Search
CPC .......... F16F 7/10; F16F 7/1034; F16F 13/007; F16F 9/19; F16F 9/20; F16F 9/32;
(Continued)

(56) References Cited

U.S. PATENT DOCUMENTS 2,363,867 A * 11/1944 Isely ..................... B61F 5/10
                                                    188/289
3,232,597 A *  2/1966 Jan ....................... F16F 7/00
                                                    267/219
(Continued)

FOREIGN PATENT DOCUMENTS

CN         102 933 868 A     2/2013
CN         202 991 714 U     6/2013
(Continued)

OTHER PUBLICATIONS

Chua, "Memristor—The Missing Circuit Element," IEEE Transactions on Circuit Theory, vol. CT-18, No. 5, pp. 507-519 (Sep. 1971).
(Continued)

*Primary Examiner* — Robert A. Siconolfi
*Assistant Examiner* — San M Aung
(74) *Attorney, Agent, or Firm* — Jenkins, Wilson, Taylor & Hunt, P.A.

(57) ABSTRACT

A hydraulic mem-inerter container device and applications thereof. The hydraulic mem-inerter container device comprises a first cylinder barrel, a first piston, and a spiral passage. The first cylinder barrel is divided by the first piston into a left cavity and a right cavity; and the spiral passage enables the left cavity and the right cavity of the first cylinder barrel to communicate, and the length of the spiral passage changes along with the change of the relative displacement of the first cylinder barrel and the first piston. The cylinder barrel and the piston serve as a first end point and a second end point that are independent and movable correspondingly. When used, the hydraulic mem-inerter container device can be connected to a system to control mechanical force. The hydraulic mem-inerter container device can serve as a regulation and control valve for an inerter and a damper.

7 Claims, 5 Drawing Sheets

(51) Int. Cl.
*F16F 7/10* (2006.01)
*F16F 9/32* (2006.01)
*F16F 9/346* (2006.01)

(58) Field of Classification Search
CPC .... F16F 9/34; F16F 9/504; F16F 9/512; F16F 9/535; F16F 9/3405
USPC ....... 188/378, 288, 289, 129, 130, 381, 317, 188/322.5, 267, 312, 267.1, 267.2; 267/134, 219
See application file for complete search history.

(56) References Cited

U.S. PATENT DOCUMENTS

| | | | | |
|---|---|---|---|---|
| 4,164,825 | A | * | 8/1979 | Hutchison ............... F41C 23/06 42/1.06 |
| 4,425,836 | A | * | 1/1984 | Pickrell ................ F15B 15/224 91/405 |
| 5,018,606 | A | | 5/1991 | Carlson |
| 5,161,653 | A | | 11/1992 | Hare, Sr. |
| 6,290,038 | B1 | * | 9/2001 | Jensen .................... B64C 25/64 188/381 |
| 2015/0330475 | A1 | * | 11/2015 | Slusarczyk ............... F16F 9/49 188/288 |
| 2016/0059656 | A1 | * | 3/2016 | Funke .................... F16F 9/062 188/267.1 |
| 2017/0328438 | A1 | * | 11/2017 | Osika .................... B60G 13/08 |
| 2017/0335916 | A1 | * | 11/2017 | Fox ........................ B64C 13/40 |

FOREIGN PATENT DOCUMENTS

| | | |
|---|---|---|
| CN | 104 494 387 A | 4/2015 |
| CN | 105 003 591 A | 10/2015 |
| DE | 10 2012 217 531 A1 | 3/2014 |
| EP | 0 382 171 A1 | 8/1990 |
| JP | S59-147133 A1 | 8/1984 |
| WO | WO 94/17317 | 8/1994 |
| WO | WO 03/005142 A1 | 1/2003 |
| WO | WO 2011/015828 A1 | 2/2011 |
| WO | WO 2011/095787 A1 | 8/2011 |

OTHER PUBLICATIONS

Oster et al., "The Memristor: A New Bond Graph Element," Transactions of the ASME, Journal of Dynamic Systems, Measurement, and Control, Paper No. 72-Aut-N, pp. 1-4 (1972).

Smith, "Synthesis of Mechanical Networks: The Inerter," IEEE Transactions on Automatic Control, vol. 47, No. 10, pp. 1648-1662 (Oct. 2002).

Strukov et al., "The missing memristor found," Nature, vol. 453, pp. 80-83, (May 1, 2008); with Corrigendum, Nature, vol. 459, p. 1154 (Jun. 25, 2009).

Jeltsema et al., "Mechanical Memory Elements: Modeling of Systems with Position-Dependent Mass Revisited," 49th IEEE Conference on Decision and Control, Hilton Atlanta Hotel, Atlanta, GA, USA, pp. 3511-3516 (Dec. 15-17, 2010).

Wang, "A Triangular Periodic Table of Elementary Circuit Elements," IEEE Transactions on Circuits and Systems, I: Regular Papers, vol. 60, No. 3, pp. 616-623 (Mar. 2013).

International Search Report for Application No. PCT/CN2016/089855 dated Sep. 14, 2016.

Chinese Office Action and First Search for Chinese Application No. 201610300595.1 dated Sep. 18, 2017; retrieved from Global Dossier on Sep. 27, 2018.

* cited by examiner

HYDRAULIC MEM-INERTER CONTAINER DEVICE AND APPLICATIONS THEREOF

CROSS-REFERENCE TO RELATED APPLICATIONS

This application is a continuation of PCT International Patent Application Serial No. PCT/CN2016/089855, filed Jul. 13, 2016, which itself claims the benefit of and priority to Chinese Patent Application No. 201610300595.1 filed May 9, 2016. The contents of each of these applications are incorporated herein by reference in their entireties, and the benefit of the filing date of the priority application is hereby claimed for all purposes that are legally served by such claim for the benefit of the filing date.

TECHNICAL FIELD

The invention relates to an inerter device and its applications, particularly to a hydraulic inerter device whose inertance depends on the relative displacement between the terminals.

BACKGROUND

In 2002, a new mechanical element named the inerter was introduced (Smith M C, "Synthesis of mechanical networks: the inerter", IEEE Transactions on Automatic Control, 47(10), 1648-1662, 2002). The inerter has two independently movable terminals, and has the property that the applied force at the terminals is directly proportional to the relative acceleration between them. Unlike the terminals of the inerter, those of mass are its centroid and a fixed point in a reference frame (mechanical ground). The mass is therefore analogous to a grounded capacitor in the case of the force-current analogy. The inerter differs from a conventional mass element since it has two terminals, which eliminates the need for a reference frame. The inerter is therefore analogous to an ungrounded capacitor. As can be seen, in the force-current analogy, the inerter, damper and spring completely correspond to the capacitor, resistor and inductor, respectively. These analogues allow electrical circuits to be "translated into" mechanical systems in an unambiguous manner. The two inerter devices, a rack-and-pinion inerter and a ballscrew inerter, were disclosed by the International Patent PCT/GB02/03056. Such devices can be applied to mechanical systems to control or counteract the vibrational forces, and have been successfully used in Formula One cars. PCT/GB2010/001491 disclosed a hydraulic inerter device (FIG. 1), which uses the mass of a fluid flowing through a helical channel to provide the inertance. Durability and simplicity are the main advantages of this inerter. However, the inertance provided by these inerters is an invariant constant, which means the inertance cannot vary with the relative displacement between the terminals.

In 1971, the concept of the memristor (Chua, L., "Memristor—the missing circuit element", IEEE Transactions on Circuit Theory, 18(5), 507-519, 1974) was introduced to describe the relationship between charge and flux linkage. The memristor is a contraction of memory and resistance, and refers to a resistor with memory. Although Chua postulated the existence of the memristor in theory, a memristive prototype could not be found until 2008 at HP Labs (Strukov D B, Snider G S, Stewart D R, Williams R S, "The missing memristor found", Nature, 453(7191), 80-83, 2008). Since the concept of the memristor was introduced, a mathematical theory involving memristor devices and memristive systems were developed. More recently, this theory was extended to include memcapacitors and meminductors, thereby resulting in an entire class of mem-models. According to mechanical-electrical analogies, the mechanical memory elements that are the counterparts of electrical memory elements are bound to exist in the mechanical systems, including the mechanical memristors, memcapacitors and meminductors. For example, a tapered dashpot with a displacement-dependent damping coefficient is a mechanical counterpart of the memristor (Oster G F, Auslander D M, "The memristor; A new bond graph element", Journal of Dynamic Systems Measurement & Control, 94(3), 249-252, 1972). Furthermore, based on the force-current analogy, the subsystem consisting of the reel and the wounded part of the cable is a rotational mechanical memcapacitor (Jeltsema D, Doria-Cerezo A, "Mechanical memory elements modelling of systems with position-dependent mass revisited", 49th IEEE Conference on Decision and Control, Atlanta Ga., USA, 3511-3516, 2010). Just like mass, the mechanical memcapacitor is analogous to a grounded memcapacitor because it has only one movable terminal. But a device which has two independently movable terminals and completely correspond to memcapacitor is not yet found.

As can be seen in the triangular periodic table of elementary circuit elements (FIG. 2, Wang F Z, "A Triangular Periodic Table of Elementary Circuit Elements", IEEE Transactions on Circuit and System, 60(3), 616-623, 2013), these circuit elements are divided into basic elements, memory elements and higher-order memory elements. Besides, the resistor, capacitor, and inductor, together with their counterparts with memory, the memristor, memcapacitor, and mem inductor, are really particular cases of a whole group of higher-order elements. By applying mechanical-electrical analogies, the triangular periodic table may be transferred from electrical to mechanical domain to obtain a triangular periodic table of elementary mechanical elements (FIG. 3), Such a table can be used to predict new mechanical elements just as Mendeleev's periodic table can be used to find new chemical elements. For example, according to the prediction of the periodic table, there should be a mechanical element named the mem-inerter (a contraction of memory and inerter, and referring to an inerter with memory) with two independently movable terminals. So far, however, the ideal mem-inerter element has not been mechanically realized yet.

The hydraulic mem-inerter device provided by the present invention provides an implementation for the ideal mem-inerter element predicted in the above periodic table. Since the device has two independently movable terminals, it completely corresponds to the memcapacitor. And thus, the device provided by the present invention can deepen the interconnections between mechanical systems and electrical systems. Meanwhile, when applied to vibration isolation and vibration damping systems, the device can overcome the disadvantage of the constant inertance provided by the inerter, and provide an inertance varying with the relative displacement between the terminals so as to better control or counteract the vibrational forces in mechanical systems. Besides, the hydraulic mem-inerter device can also be used as a valve to continuously adjust and control the inertance.

SUMMARY

The present invention is aimed to provide a hydraulic mem-inerter device as an implementation of the ideal mem-inerter element and based on the distinctive performance of the device to explore its potential applications, so as to enhance the interconnections between mechanical systems and electrical systems and expand the content and scope of the mechanical-electrical analogies.

For the above purposes, the present invention adopts the following technical scheme: a hydraulic mem-inerter device, comprising a first cylinder, a first piston and a helical path. The first piston divides the first cylinder into left and right chambers which are connected by the helical path whose length varies with the relative displacement between the first cylinder and the first piston.

Furthermore, the first cylinder has two internal surfaces with different diameters, namely, the internal surface with major diameter and the internal surface with minor diameter, respectively. The outer surface of the first piston is matched with the internal surface with minor diameter of the first cylinder to divide the first cylinder into left and right chambers. The outer surface of the first piston has a helical channel, such that, when inserted inside the first cylinder, a helical path formed between the helical channel and the internal surface with minor diameter can connect the left chamber with the right chamber of the first cylinder.

The above scheme can also be replaced with the following scheme: the first cylinder has two internal surfaces with different diameters, namely, the internal surface with major diameter and the internal surface with minor diameter, respectively. The outer surface of the first piston is matched with the internal surface with minor diameter of the first cylinder to divide the first cylinder into left and right chambers. The internal surface with minor diameter has a helical channel, such that, when the first piston is inserted inside the first cylinder, a helical path formed between the helical channel and the outer surface of the first piston can connect the left chamber with the right chamber of the first cylinder.

Furthermore, the helical channel has a fixed helix pitch or a variable helix pitch.

Furthermore, the momentum and relative velocity characteristic curve of the hydraulic mem-inerter device is a pinched hysteresis loop, and the momentum integral and relative displacement characteristic curve of it is a single-valued mapping.

When the hydraulic mem-inerter device is used as a mem-dashpot, the first cylinder and the first piston of the hydraulic mem-inerter device are the two independently movable terminals of mem-dashpot. The damping force and relative velocity characteristic curve of the mem-dashpot is a pinched hysteresis loop, and the momentum and relative displacement characteristic curve of it is a single-valued mapping.

When the hydraulic mem-inerter device provided by the present invention is used as a variable mass element, any one of the first cylinder and the first piston of the hydraulic mem-inerter device is fixed.

The hydraulic mem-inerter device provided by the present invention can be used in mechanical systems to control or counteract the vibrational forces.

The present invention also provides an adjustable inerter device, comprising a first cylinder, a first piston and a helical path. The first piston divides the first cylinder into left and right chambers which are connected by the helical path whose length varies with the relative displacement between the first cylinder and the first piston. The two first openings are respectively arranged on the ends of the first cylinder wall. The fluid flows into one of the first openings and out from the other first opening of the first cylinder via the helical path.

Furthermore, the first openings respectively arranged on the ends of the first cylinder wall are normally opened relative to the first piston.

Furthermore, the first cylinder has two internal surfaces with different diameters, namely, the internal surface with major diameter and the internal surface with minor diameter, respectively. The outer surface of the first piston is matched with the internal surface with minor diameter of the first cylinder to divide the first cylinder into left and right chambers. The outer surface of the first piston has a helical channel, such that, when inserted inside the first cylinder, a helical path formed between the helical channel and the internal surface with minor diameter can connect the left chamber with the right chamber of the first cylinder.

The above scheme can also be replaced with the following scheme: the first cylinder has two internal surfaces with different diameters, namely, the internal surface with major diameter and the internal surface with minor diameter, respectively. The outer surface of the first piston is matched with the internal surface with minor diameter of the first cylinder to divide the first cylinder into left and right chambers. The internal surface with minor diameter has a helical channel, such that, when the first piston is inserted inside the first cylinder, a helical path formed between the helical channel and the outer surface of the first piston can connect the left chamber with the right chamber of the first cylinder.

Furthermore, the above scheme includes two hydraulic tubes and a hydraulic cylinder. The hydraulic cylinder includes a second cylinder and a second piston, and the second piston divides the second cylinder into left and right chambers. The two second openings are respectively arranged on the ends of the second cylinder wall, respectively connecting with the first openings on the first cylinder by the hydraulic tubes.

Furthermore, the second openings respectively arranged on the ends of the second cylinder wall are normally opened relative to the second piston.

The benefits of the present invention: First, a hydraulic mem-inerter device provided by the present invention has the following characteristics: (1) the inertance provided by the device varies with the relative displacement between the terminals; (2) the momentum and velocity characteristic curve of the device is a pinched hysteresis loop, which has been identified in the electrical domain as the fingerprint for a collection of circuit elements with memory; (3) the momentum integral and displacement characteristic curve of the device is a single-valued mapping. These characteristics show that the hydraulic mem-inerter device is an implementation of the ideal mem-inerter element. It can overcome the disadvantage of the constant inertance provided by prior inerters, and provide an inertance varying with the relative displacement between the terminals so as to better control or counteract the vibrational forces. Second, since the device has two independently movable terminals (the first cylinder and the first piston), it completely correspond to the memcapacitor. And thus, it can deepen the interconnections between mechanical systems and electrical systems and expand the content and scope of the mechanical-electrical analogies. Third, when applied to vibration isolation and vibration damping systems, the device can overcome the disadvantage of the constant inertance provided by the inerters, and provide an inertance varying with the relative displacement between the terminals so as to better control or counteract the vibrational forces in mechanical systems. Fourth, the hydraulic mem-inerter device can also be used as a valve to continuously adjust and control the inertance.

BRIEF DESCRIPTION OF THE DRAWINGS

Embodiments of the present invention will be further described with reference to the accompanying drawings.

In the figures: 1—First cylinder; 2—Helical channel: 3—First piston; 4—First piston rod; 5—Internal surface with major diameter; 6—Internal surface with minor diameter; 7—Fluid; 8—First openings; 9—Hydraulic mem-inerter device; 10—Hydraulic tubes; 11—Hydraulic cylinder; 12—Second cylinder; 13—Second piston; 14—Second piston rod; 15—Second openings.

DETAILED DESCRIPTION

Devices provided the present invention will be further described with reference to the accompanying drawings and embodiments.

Figure 4:
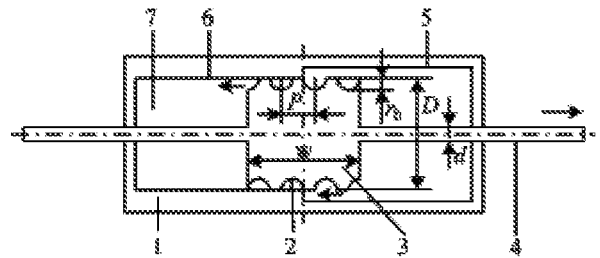
FIG. 4 is the schematic of an external-helix hydraulic mem-inerter device.

FIG. 4 illustrates a first embodiment of a hydraulic mem-inerter device, comprising a first cylinder 1, a first piston 3, and a fluid 7. The first cylinder 1 has two internal surfaces with different diameters, namely, the internal surface with major diameter 5 and the internal surface with minor diameter 6, respectively, and the interior of the first cylinder 1 is filled with a fluid 7. The outer surface of the first piston 3 is matched with the internal surface with minor diameter 6 of the first cylinder 1 to divide the first cylinder 1 into left and right chambers. The outer surface of the first piston 3 has a helical channel 2, such that, when inserted inside the first cylinder 1, a helical path formed between the helical channel 2 and the internal surface with minor diameter 6 can connect the left chamber with the right chamber of the first cylinder 1. Movement of the first piston 3 relative to the first cylinder 1 causes the fluid 7 to flow out from one chamber and into the other chamber via the helical path, which can generate an inertial force due to the moving mass of the fluid in the helical path. The first cylinder 1 may include one terminal, and the first piston 3 may include the other terminal of the device. Since the length of the helical path varies with the relative displacement between the terminals, the ratio of the inertial force to the relative acceleration, the inertance, varies with the relative displacement between them. Besides, the momentum and velocity characteristic curve of the mem-inerter device is a pinched hysteresis loop, and the momentum integral and displacement characteristic curve of it is a single-valued mapping.

Figure 5:
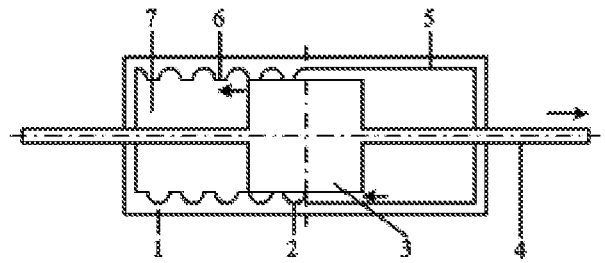
FIG. 5 is the schematic of an internal-helix hydraulic mem-inerter device.

FIG. 5 illustrates a second embodiment of a hydraulic mem-inerter device. The difference of the two embodiments is that the helical channel 2 is located on the outer surface of the first piston 3 in the first embodiment, but on the internal surface with minor diameter 6 of the first cylinder 1 in the second embodiment.

For the first and second embodiments, the helical channel 2 has a cross-section which is a semi-disc which is convenient for machining. Other cross-sectional shapes may also be employed as required. Similarly, the pitch of the helical channel 2 can be designed to a fixed value or a variable value. In addition, the first cylinder 1 can also be a valve body or a shell containing a chamber.

The two devices of FIGS. 4 and 5 are implemented using the through-rod 4. Alternatives using a single rod with a floating piston or a double cylinders or other similar arrangements are equally feasible. Means to cause the fluid to flow are envisaged.

In the embodiments shown in FIGS. 4 and 5, the characteristic parameter of the devices, namely the inertance, is not a constant. It can be varied with altering relative displacement. In other words, the inertance is a function of the relative displacement, and the function is determined by the diameter and width of the piston, the radius and pitch of the helical channel, the fluid density, etc.

The following aspects illustrate that the device provided by the present invention is an implementation of an ideal mem-inerter element by FIG. 4.

Figure 1:
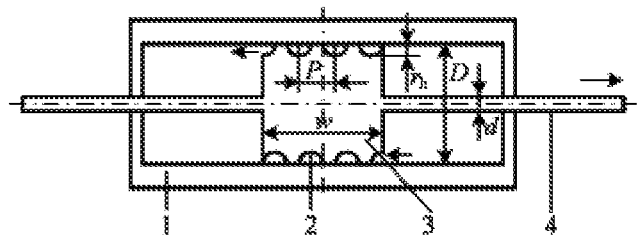
FIG. 1 is the schematic of a hydraulic inerter device.
Figure 2:
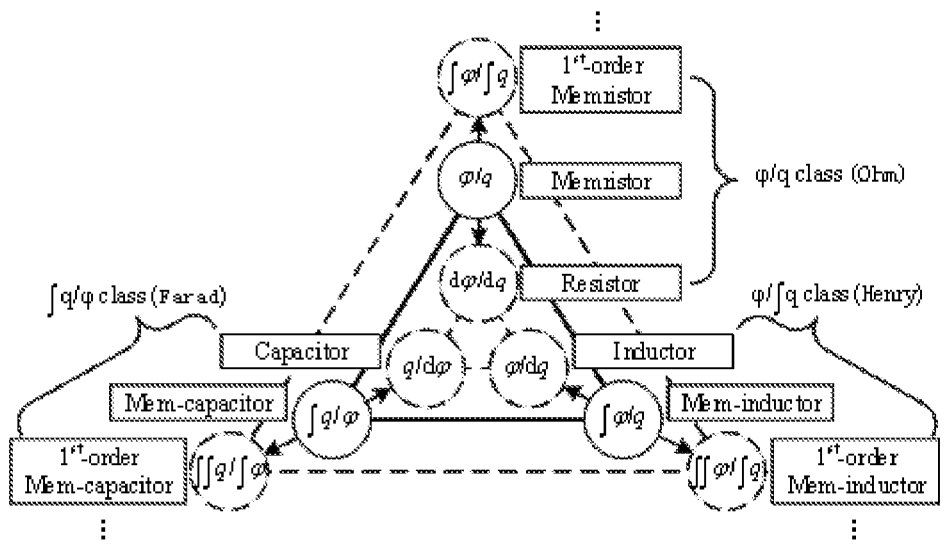
FIG. 2 is the triangular periodic table of elementary circuit elements.

Consider the hydraulic inerter device shown in FIG. 1, which is a prior art. Let $A_1$ be the effective cross-sectional area of the first piston 3, namely, the working area of the first piston 3. Let $A_2$ be the cross-sectional area of the semicircular helical channel, be the channel length and p be the density of the fluid 7. Let F be the equal and opposite force applied to the terminals and x be the relative displacement between them. According to the International Patent PCT/GB2010/001491, the hydraulic mem-inerter depicted in FIG. 1 can be modelled as an ideal inerter element, as a result, the relative acceleration between the terminals and the force applied to them are related linearly as follows:

$$F = B\ddot{x} \tag{1}$$

where B is the inertance in kg, it can be expressed as $$B = \rho l \frac{A_1^2}{A_2} \tag{2}$$

Let $m_F$ be the mass of the fluid in the channel, then Eq. (2) can be represented in the form $$B = m_F \left(\frac{A_1}{A_2}\right)^2 \tag{3}$$

It indicates that the inertance is directly proportional to the mass of the fluid in the channel, and to the square of the cross-sectional area ratio between the piston and the channel.

Let D be the diameter of the piston, d be the diameter of the piston rod, $r_h$ be the radius of the helical channel, P be the pitch of the helix, and w be the piston width. Eq. (2) will be rewritten as follows:

$$B = b_0 w \tag{4}$$

where $b_0$ is the inertance constant $$b_0 = \frac{\pi\rho(D^2 - d^2)^2 \sqrt{P^2 + (\pi D)^2}}{8Pr_h^2} \quad (5)$$

The mechanism can be designed to make the linear inerter into nonlinear or displacement-dependent. To this end, a modified cylinder with enlarged radius of the internal surface in the right half part is considered by the present invention as shown in FIG. 4, so that the length of a helical channel surrounded by the internal surface with minor diameter of the cylinder, namely, the length of the helical path, is changed during the motion of the piston, and the mass of the fluid in helical path is successively varied. According to Eq. (3) or Eq. (4), the inertance is consequently varied. Therefore, the linear inerter with a constant inertance is converted to the nonlinear inerter with a variable displacement-dependent inertance.

For the designed displacement-dependent inerter device shown in FIG. 4, the working width of the piston, which is linearly related to the length of the helical path, is equal to (w/2) x, where the origin of coordinates is located on the center of the cylinder. Obviously, the piston must run between −w/2 and w/2, i.e., x∈[−w/2, w/2]. Therefore, it is needed to substitute (w/2)−x for w into Eq. (4) as follows:

$$B(x) = b_0\left(\frac{w}{2} - x\right) \quad (5)$$

It indicates that the inertance at a given instant is an explicit function of the relative displacement between the terminals.

Figure 3:
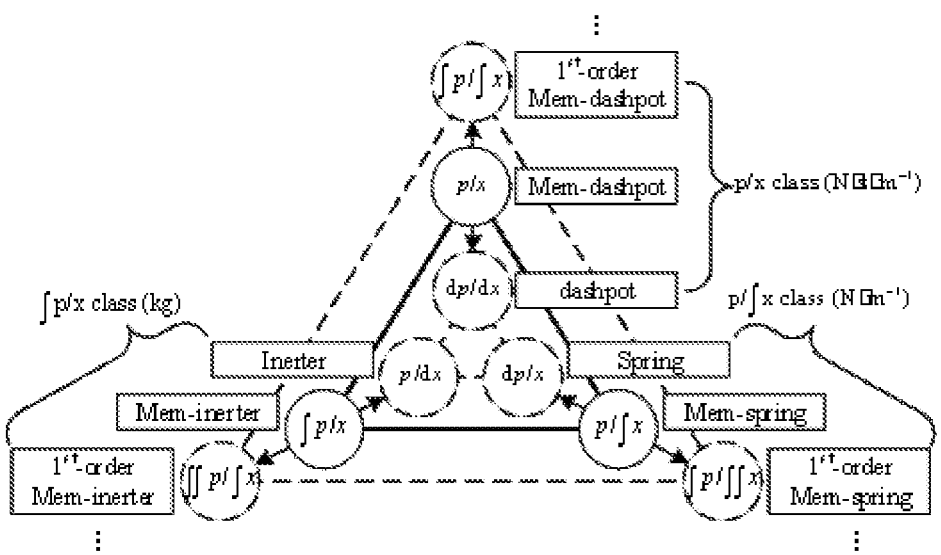
FIG. 3 is the triangular periodic table of elementary mechanical elements.

It is easy to know that the relationship between displacement x and momentum p, which are the time integrals of velocity v and force F, respectively, defines the mechanical analog of a memristor, namely, the mem-dashpot (see FIG. 3). Consider a constitutive relationship between integrated momentum δ and displacement x, as shown in FIG. 3, i.e., $$\delta = \hat{\delta}(x), \text{ with } \delta := \int_{-\infty}^{t} p(\tau)d\tau \quad (6)$$

Differentiating the latter with respect to time yields $$p = \frac{d\hat{\delta}}{dx}(x)v \quad (7)$$

By defining $B(x) = d\hat{\delta}(x)/dx$, the displacement-dependent inerter shown in FIG. 4 can be described by the following equation:

$$p = B(x)v \quad (8)$$

Suppose that we actuate the device with dimensions from Tab.1, using a sinusoidal velocity excitation v=Aω sin(ωt+π/2), and compare the characteristics of the device for different helix pitches. Considering the maximum working stroke of the device, it is assumed that A=0.05 m and ω=2π. The results are shown in FIG. 4.

TABLE 1

Displacement-dependent inerter details.

| Description | Value |
|---|---|
| Piston diameter D | 0.1 m |
| Piston rod diameter d | 0.012 m |
| Helical channel radius $r_h$ | 0.008 m |
| Helix pitch P | 0.04 m |
| Piston width w | 0.1 m |
| Working stroke L | 0.1 m |
| Fluid density ρ | 1000 kg m$^{-3}$ |

Figure 6A:
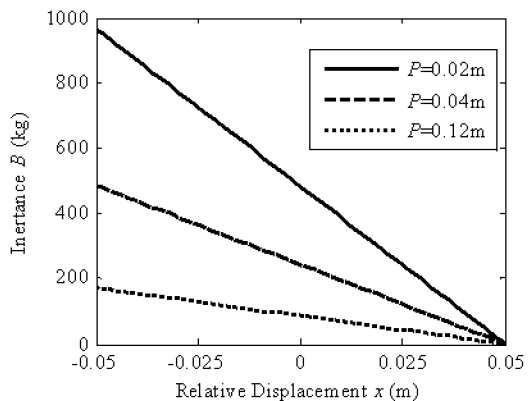
FIGS. 6a-6c are the inertance and mechanical characteristic curves of the mem-inerter device.
Figure 6B:
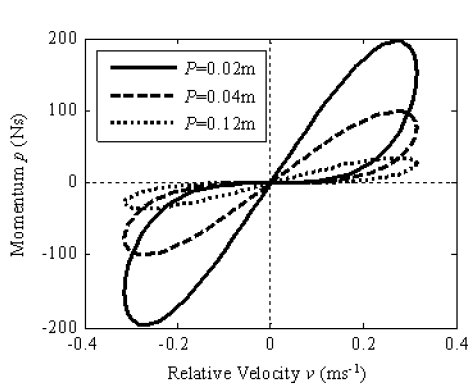
Figure 6C:
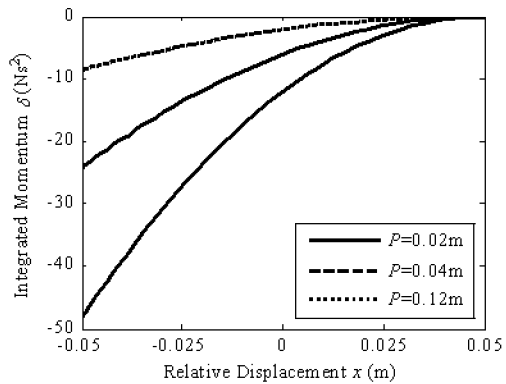

FIG. 6a shows that the inertance of the device shown in FIG. 4 is not a constant, but varies with the relative displacement between the terminals, which proves that the device is a displacement-dependent inerter. As can be seen in FIG. 6b, the relationship between momentum and velocity is two-valued everywhere except at the origin. This means if the memory elements are not considered, we will not define a proper relation for the curve shown in FIG. 6b, i.e., a single-valued mapping, between momentum p and velocity v. These difficulties are circumvented by modelling the displacement-dependent inerter as a mem-inerter, as obtained in Eq. (7), using the single-valued relationship between integrated momentum and displacement variable to define the displacement-dependent inerter as a mem-inerter (see FIG. 6c). In fact, pinched hysteresis loops as observed in FIG. 6b have been identified in the electrical domain as the fingerprints for a collection of circuit elements with memory. Therefore, according to the mechanical-electrical analogies, the displacement-dependent inerter device shown in FIG. 4 can be identified as a mem-inerter device. This means that the hydraulic mem-inerter device provided by the present invention is an implementation of the ideal mem-inerter element.

Figure 7A:
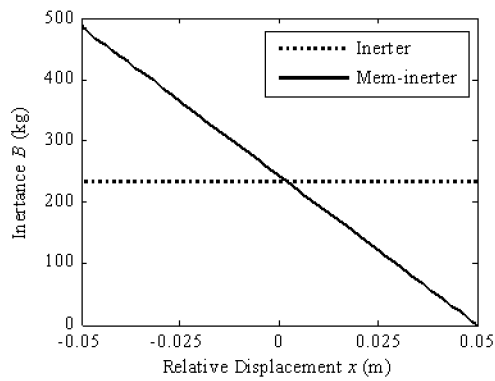
FIGS. 7a-7d are the comparison of the characteristic curves between the mem-inerter and inerter device.
Figure 7B:
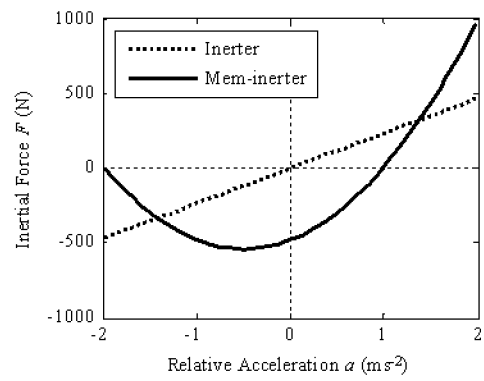
Figure 7C:
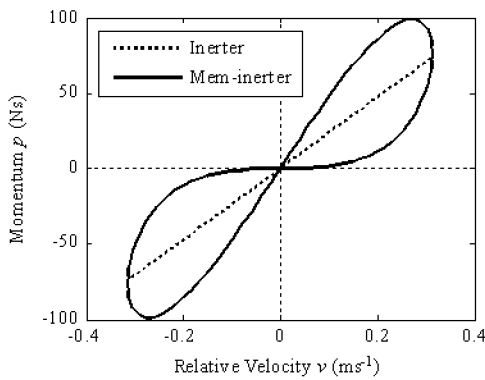
Figure 7D:
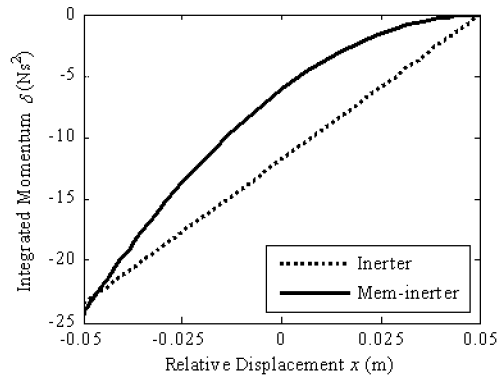

FIG. 7a clearly shows the difference between the inerter and the mem-inerter. That is, the inertance of the inerter is a constant value, and the inertance of the mem-inerter is a variable value which is related to the relative displacement between the terminals. As can be seen in FIG. 7b, the inerter has the property that the applied force at the terminals is directly proportional to the relative acceleration between them, while the mem-inerter obviously differs from the inerter in the mechanical characteristics. As shown in FIG. 7c, the p-v characteristic curve of the inerter device is a straight line, while one of the mem-inerter device is a pinched hysteresis loop which have been accepted as the fingerprints of memory elements. It is visible that the two devices are essentially different. One is a common element and the other is a memory element. Similarly, the momentum integral and displacement characteristic curve shown in FIG. 7d also indicates that the two devices have different characteristics. Therefore, in terms of the displacement correlation of the inertance, mechanical properties and essential characteristics, the mem-inerter is essentially different from the inerter, and they are two different mechanical elements.

The further modelling and testing demonstrated that the viscosity of the fluid provides a departure from ideal behavior, and flowing fluid may make a mem-inerter device produce a parasitic damping. This means the hydraulic mem-inerter device can be further modelled as an ideal mem-inerter element in parallel with a parasitic damping element.

The following aspects illustrate the parasitic damping of the mem-inerter in detail by FIG. 4.

Consider the hydraulic inerter device shown in FIG. 1, where a piston, a cylinder, a helical channel and a fluid with viscosity make up a simple viscous damper. According to the Hagen-poiseuille flow equation, the damping coefficient of the simple viscous damper can be obtained, i.e., $$c = 8\pi\mu l \left(\frac{A_1}{A_2}\right)^2 \tag{9}$$

where $\mu$ is the viscosity of fluid.

Eq. (9) can also be represented in the form $$c = \frac{8\pi\mu\sqrt{P^2 + (\pi D)^2}}{P}\left(\frac{A_1}{A_2}\right)^2 w \tag{10}$$

For the displacement-dependent inerter device shown in FIG. 4, as described before, the length l of the helical path varies with the relative displacement between the terminals in the running process. Therefore, it can be known by Eq. (9) that the damping coefficient of the mem-inerter device is dependent on the relative displacement. In like manner, it is needed to substitute (w/2)−x for w into Eq. (10) as follows:

$$c(x) = \frac{8\pi\mu\sqrt{P^2 + (\pi D)^2}}{P}\left(\frac{A_1}{A_2}\right)^2\left(\frac{w}{2} - x\right) \tag{11}$$

It indicates that the parasitic damping c(x) of the mem-inerter device at a given instant is an explicit function of the relative displacement between the terminals.

Under the sinusoidal velocity excitation v=Aω sin(ωt+π/2) with A=0.05 m, ω=2π and μ=10⁻³ Pas, the damping characteristic curves of the mem-inerter device are shown in FIG. 8.

Figure 8A:
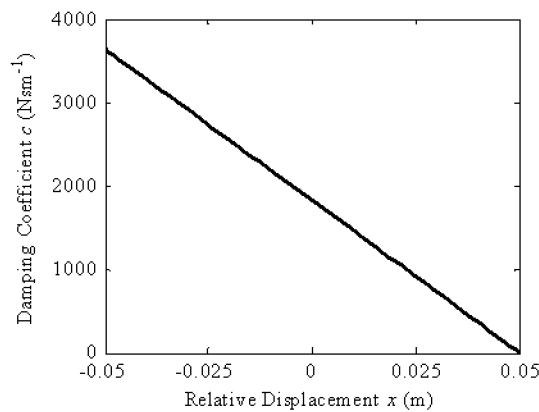
FIGS. 8a-8c are the damping characteristic curves of the mem-inerter device.
Figure 8B:
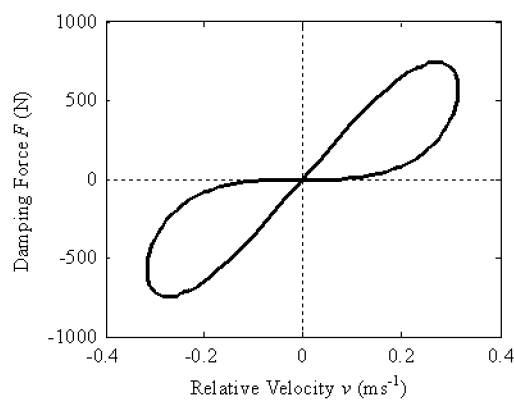
Figure 8C:
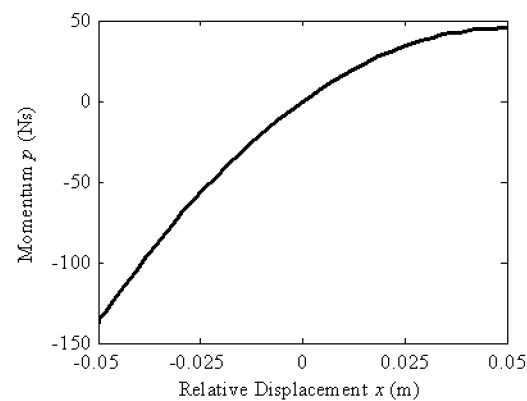

FIG. 8a shows that the damping coefficient of the mem-inerter device is not a constant, but varies with the relative displacement between the terminals, which proves that the damping characteristic of the device is dependent on the relative displacement. It is well-known that the F-v curve of the linear damper is a straight line with a slope, while the F-v damping characteristic curve of the device is a pinched hysteresis loop as observed in FIG. 8b, which is identified as a typical fingerprint for a mem-dashpot. This means the device with the parasitic damping is a mem-dashpot. Since the F-v curve described above is not a single-valued mapping, the damping characteristics of the mem-dashpot cannot be defined by the relationship between the damping force F and velocity v. As can be seen in FIG. 8c, the F-x curve of the device is a single-valued mapping, and thus the damping characteristics of the mem-dashpot can be defined by the relationship between the momentum and relative displacement.

In conclusion, the device provided by the present invention can be modelled as an ideal mem-inerter element. That is, the device is an implementation of the ideal mem-inerter element. Considering the viscosity of the fluid, the device provided by the present invention could produce a parasitic damping which is a damping with memory rather than a common damping. The mem-inerter device provided by the present invention is essentially different from the prior inerters device in the displacement correlation of the inertance, mechanical properties and parasitic damping characteristics. They are two different mechanical elements. From the characteristic curves, the mem-inerter device has better mechanical properties to control and counteract vibrational forces.

Figure 9:
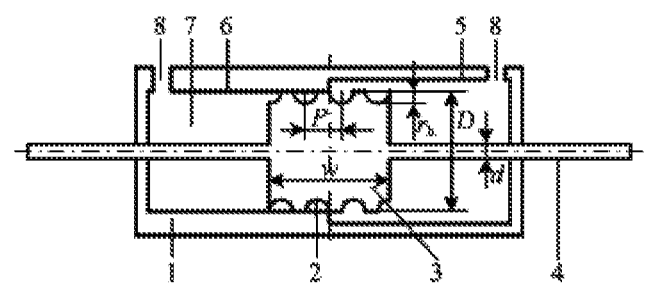
FIG. 9 is the schematic of a hydraulic mem-inerter device used as an adjustment and control valve.
Figure 10:
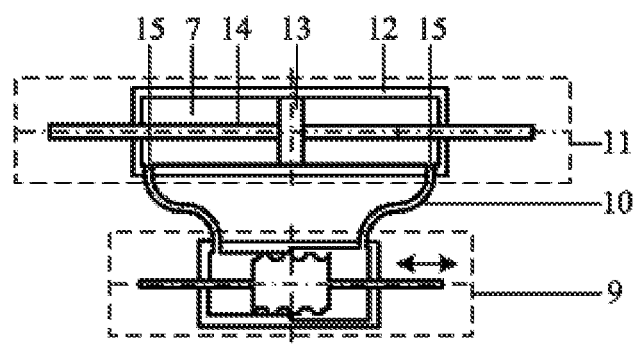
FIG. 10 is the schematic of a continuously adjustable inerter device.

The following aspects further illustrate the application of the hydraulic mem-inerter device as an adjustment and control valve of the inertance by FIGS. 9 and 10.

In FIG. 9, when the hydraulic mem-inerter device is used as an adjustment and control valve of the inertance, the two openings 8 are respectively arranged on the ends of the cylinder wall, so that the fluid outside of the device can flows into one of the first openings and out from the other first opening of the first cylinder via the helical path. The setting principle of the openings 8 is not to be covered by the piston 3 (that is, the first openings 8 respectively arranged on the ends of the first cylinder wall are normally opened relative to the first piston 3). By continuously adjusting and controlling the relative displacement between the terminals of the device, in use, the length of the helical path and the mass of the fluid in the path can be changed to achieve continuous adjustment and control of the inertance.

FIG. 10 is an embodiment of the application as an adjustment and control valve of the inertance, namely, an adjustable inerter device, comprising a hydraulic mem-inerter device 9, two hydraulic tubes 10 and a hydraulic cylinder 11. The hydraulic cylinder 11 includes a second cylinder 12 and a second piston 13, and the second cylinder 12 and the second piston 13 are the first and second terminals for connection, in use, to components in a system for controlling mechanical forces and independently movable. The two second openings 15 are respectively arranged on the ends of the second cylinder wall. Moreover, the setting principle of the second openings 15 is not to be covered by the second piston 13 (that is, the second openings 15 respectively arranged on the ends of the second cylinder wall are normally opened relative to the second piston 13). The two second openings 15 of the second cylinder 12 respectively connect with two first openings 8 on the first cylinder 1 by the hydraulic tubes 10. The whole adjustable inerter device is filled with a fluid 7.

For the adjustable inerter device shown in FIG. 10, let $S_1$ be the effective cross-sectional of the second piston 13. According to Eq. (5), the inertance between the terminals (the second cylinder 12 and the second piston 13) can be calculated when an instant or a position of the first piston 3 of the mem-inerter device 9 are given, i.e., $$B_v(x) = \left(\frac{S_1}{A_1}\right)^2 B(x) \tag{12}$$

According to Eq. (11), the parasitic damping coefficient between the terminals (the second cylinder 12 and the second piston 13) can be calculated at this time, i.e., $$c_v(x) = \left(\frac{S_1 - A_2}{A_1}\right)^2 c(x) \tag{13}$$

Equations (5) and (12) indicate that the inertance provided by the adjustable inerter device continuously varies with the relative displacement between the terminals of the mem-inerter device 9. In other words, the inertance can be continuously adjusted and controlled by continuously changing the relative displacement between the terminals of the mem-inerter device 9.

Equations (11) and (13) indicate that the parasitic damping coefficient provided by the adjustable inerter device 9 continuously varies with the relative displacement between the terminals of the mem-inerter device 9, In other words, the damping coefficient can be continuously adjusted and controlled by continuously changing the relative displacement between the terminals of the mem-inerter device 9.

We claim:

1. A hydraulic mem-inerter device, comprising:
   a first cylinder;
   a first piston; and
   a helical path;
   wherein the first piston divides the first cylinder into left and right chambers, which are connected by the helical path;
   wherein a length of the helical path varies with the relative displacement between the first cylinder and the first piston; and
   wherein a momentum and relative velocity characteristic curve of the hydraulic mem-inerter device is a pinched hysteresis loop, and a momentum integral and relative displacement characteristic curve of it is a single-valued mapping.

2. The hydraulic mem-inerter device according to claim 1, wherein:
   the first cylinder has two internal surfaces with different diameters, namely the internal surface with major diameter and the internal surface with minor diameter, respectively;
   the outer surface of the first piston is matched with the internal surface with minor diameter of the first cylinder to divide the first cylinder into left and right chambers; and
   the outer surface of the first piston has a helical channel, such that, when inserted inside the first cylinder, a helical path formed between the helical channel and the internal surface with minor diameter can connect the left chamber with the right chamber of the first cylinder.

3. The hydraulic mem-inerter device according to claim 1, wherein:
   the first cylinder has two internal surfaces with different diameters, namely the internal surface with major diameter and the internal surface with minor diameter, respectively;
   the outer surface of the first piston is matched with the internal surface with minor diameter of the first cylinder to divide the first cylinder into left and right chambers; and
   the internal surface with minor diameter has a helical channel, such that, when the first piston is inserted inside the first cylinder, a helical path formed between the helical channel and the outer surface of the first piston can connect the left chamber with the right chamber of the first cylinder.

4. The hydraulic mem-inerter device according to claim 2, wherein the helical channel has a fixed helix pitch or a variable helix pitch.

5. Use of a hydraulic mem-inerter device according to claim 1 as a mem-dashpot, wherein:
   the first cylinder and the first piston of the hydraulic mem-inerter device are two independently movable terminals of mem-dashpot;
   the damping force and relative velocity characteristic curve of the mem-dashpot is a pinched hysteresis loop; and
   the momentum and relative displacement characteristic curve of it is a single-valued mapping.

6. Use of a hydraulic mem-inerter device according to claim 1 as a variable mass element, wherein any one of the first cylinder and the first piston of the hydraulic mem-inerter device is fixed.

7. Use of a hydraulic mem-inerter device according to claim 1 in a mechanical system to control or counteract the vibrational forces.

* * * * *